Patented May 20, 1952

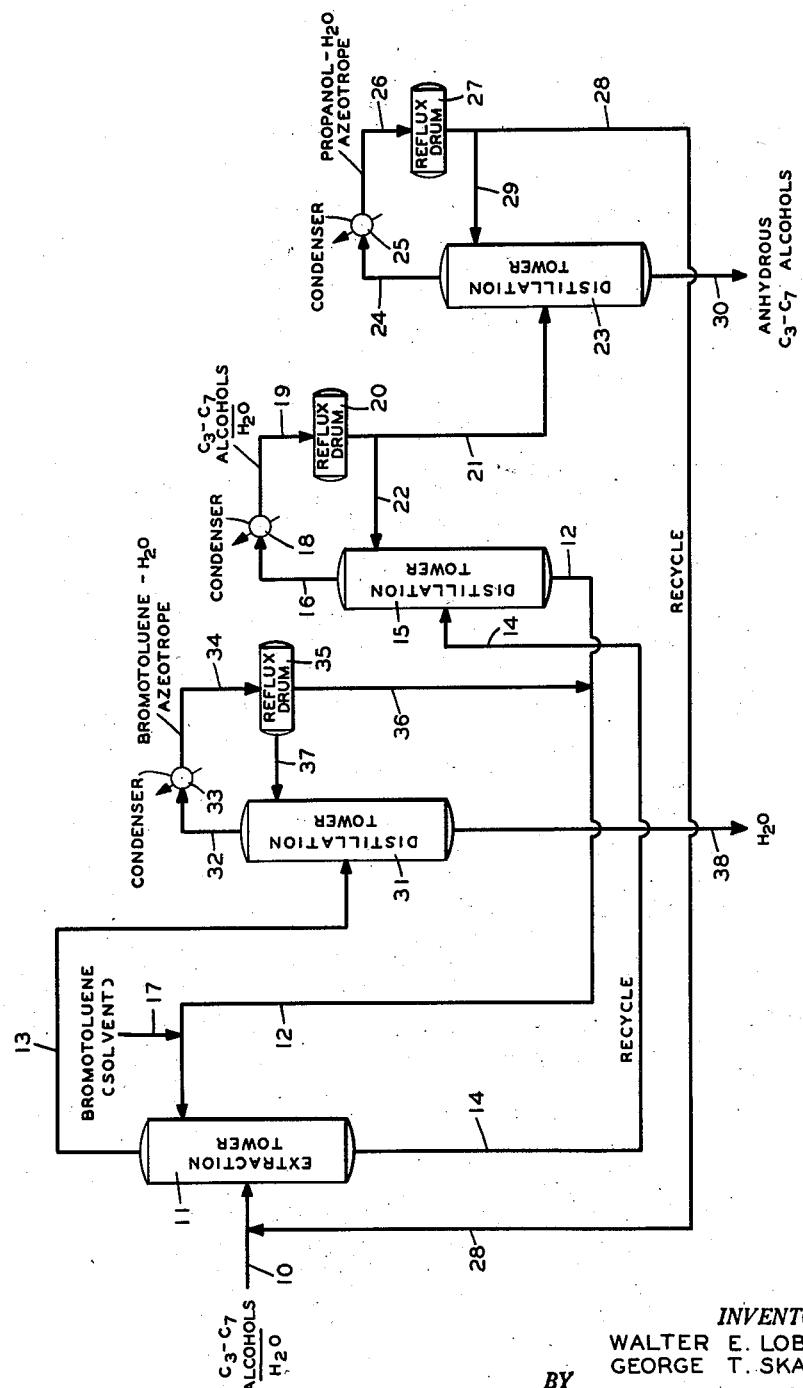

2,597,009

UNITED STATES PATENT OFFICE 2,597,009

DEHYDRATION OF ALCOHOLS

Walter E. Lobo, Westfield, N. J., and George T. Skaperdas, New York, N. Y., assignors to The M. W. Kellogg Company, Jersey City, N. J., a corporation of Delaware Application May 28, 1948, Serial No. 29,764

16 Claims. (Cl. 260—450)

This invention relates to the dehydration of alcohols and relates more particularly to the dehydration of aqueous solutions of alcohols having at least three carbon atoms per molecule. Still more particularly, the invention relates to a method for the dehydration of aqueous solutions of alcohols having at least three carbon atoms per molecule, which may be present in admixture with heavier alcohols, obtained as products from the condensation of the reaction effluent produced in processes for the catalytic hydrogenation of oxides of carbon.

Heretofore, several well-known methods have been indicated for dehydrating methanol and higher alcohols to obtain marketable alcohols which are substantially water-free. In the utilization of these methods, no particular difficulty is normally encountered in effecting the separation of commercially marketable methanol and ethanol from higher alcohols, by reason that methanol and ethanol can be readily distilled from their aqueous solutions containing higher alcohols; ethanol being obtained as its water-azeotrope, which is its commercially marketable form. However, in attempting to dehydrate $C_3$ and higher alcohols by the aforementioned methods, such as employing entrainers to take the water overhead by azeotropic distillation, it has been found that relatively large heat duties applied to the distillation apparatus are required, by reason of the proportionately large quantities of entrainer that are distilled. Furthermore, when highly dilute aqueous solutions of $C_3$ and higher alcohols are subjected to fractionation without the use of entrainers, the resulting water-azeotropes of these alcohols represent the maximum degree of dehydration obtainable, excess water being removed as bottoms. On the other hand, when no excess of water over the alcohol-water azeotrope is present in the feed, these azeotropes are taken overhead and some quantities of substantially water-free alcohols are recovered as bottoms. In none of these instances can water-free $C_3$ or higher alcohols be recovered quantitatively. Hence, from an economic standpoint, these methods in their various modifications have not, in the aforementioned respects, been found to be completely satisfactory.

In the dehydration of dilute aqueous solutions of $C_3$ and higher alcohols obtained by the condensation of the reaction effluent produced in processes for the catalytic hydrogenation of oxides of carbon, known dehydration methods comprise azeotropic distillation with entrainers such as benzene. In this respect, we have found that because of the relatively low content of propanol in its ternary azeotrope with benzene and water, it becomes necessary to evaporate approximately 11 pounds of aqueous propanol to obtain one pound of propanol, substantially water-free. This high evaporation requirement necessitates the use of relatively larger equipment and increased heat duties. Proportionate differences in the quantity of substantially water-free alcohol obtained per pound of aqueous alcohol solution evaporated, are realized where such solutions contain $C_3$ and higher boiling alcohols.

It is, therefore, a primary object and the process of this invention is directed, to provide for an economical method for the dehydration of aqueous solutions of alcohols having at least three carbon atoms per molecule.

Another object of the invention is to provide for an economical method for the dehydration of aqueous solutions of alcohols having at least three carbon atoms per molecule, which may be present in admixture with heavier alcohols, obtained as products from the condensation of the reaction effluent produced in processes for the catalytic hydrogenation of oxides of carbon.

Other objects and advantages inherent in the invention will be apparent from the following more detailed disclosure.

We have now found that the aforementioned large evaporation requirements for the dehydration of $C_3$ and heavier alcohols may be decreased by taking advantage of the excellent distribution coefficients of these alcohols between liquid halogenated hydrocarbons and water and the relatively low solubility of these halogenated hydrocarbons in water or in the aforementioned aqueous alcohol solutions. Thus, we have found that by using these halogenated hydrocarbons as solvents, substantially complete extraction of these alcohols from their aqueous solutions may be effected by marked reductions in solvent rates, thus allowing the use of relatively smaller equipment and heat requirements, than would be required when using entrainers, such as benzene, xylene or toluene. In using the aforementioned entrainers, it has heretofore been necessary to subject these dilute aqueous alcohols to azeotropic distillation, taking off excess water as bottoms. The resulting mixture of alcohols in their ternary azeotropes with water and an entrainer such as benzene, is condensed and subjected to phase separation, the resulting lower water-rich layer being returned to the distillation system as reflux, while the upper benzene layer containing azeotropic alcohols, is distilled to take the alcohol-benzenewater azeotrope overhead, and substantially water-free alcohols are recovered as bottoms.

Using a liquid halogenated hydrocarbon as a solvent or extraction medium, for the aforementioned aqueous $C_3$ and higher alcohols, we have found that the resulting extract may be easily distilled to obtain separation of the extracted alcohols and dissolved water from the solvent. The resulting aqueous alcohol fraction thus obtained comprises aqueous alcohols, richer in alcohol content than the alcohol-water azeotrope ordinarily obtained when the aforementioned commercial solvents are used as azeotropic entrainers. This fraction is next passed to a conventional dehydration zone, such as a distillation tower, in which alcohol-water azeotropes are distilled overhead and recycled to the aqueous alcohol feed; while the remaining fraction from the distillation, consists of alcohols substantially water-free. The alcohol-water azeotrope obtained from this last mentioned distillation or dehydration step, has been found to be considerably smaller in volume than the quantities of ternary azeotropes obtained when using any of the aforementioned commercial azeotropic entrainers, such as benzene. The resulting increase in degree of dehydration per volume of solvent, achieved by using the presently disclosed liquid hydrocarbons as solvents, will be apparent in the examples hereinafter given.

As liquid halogenated hydrocarbons, which can be used in the dehydration of aqueous solutions of $C_3$ and higher alcohols, we find the following compounds or mixtures thereof particularly attractive, although their use alone is not restricted to the successful operation of the process of the invention. Thus, we may successfully employ halogenated paraffins, such as carbon tetrachloride, or chloroform; or brominated paraffins such as ethyl bromide, propyl bromide, butyl bromide, iso-amyl bromide, and the like. We may also use halogenated aromatics such as bromotoluene, bromobenzene or bromochlorobenzene and the like. We may also use halogenated unsaturated hydrocarbons such as propargyl chloride, or halogenated olefins such as allyl chloride, allyl bromide, trichloroethylene vinyl-ethyl bromide and the like. In addition, we can successfully use halogenated cyclo compounds, and their derivatives, of the paraffins, aromatics, and olefins if desired. For example chlorocyclohexane may be used as a preferred halogenated cycloparaffin. In general, the proper choice of a suitable halogenated hydrocarbon as a solvent, in addition to the aforementioned distribution coefficient and solubility characteristics, may be determined by its boiling point in relation to the boiling points of the alcohols to be dehydrated. Hence, it is desirable to employ one of the above mentioned compounds as a solvent, whose boiling point is either higher than the heaviest alcohol, or lower than the lightest alcohol, to be dehydrated, although intermediate boiling solvents can also be used. Thus, in dehydrating propanol alone, or in admixture say with alcohols as high-boiling as heptanol, which are obtained as products from the aforementioned catalytic hydrogenation of oxides of carbon, we may employ a halogenated paraffin such as carbon tetrachloride, whose boiling point of 76° C. is lower than the lightest alcohol component in the aqueous feed, for example, propanol whose boiling point is 82.3° C. On the other hand, we may employ a halogenated aromatic such as o-bromotoluene whose boiling point of 181.7° C. is higher than the heaviest alcohol present in the feed, for example, heptanol whose boiling point is 176° C.

The accompanying drawing illustrates diagrammatically one form of the apparatus employed and capable of carrying out one embodiment of the process of the invention. While the invention will be described in detail by reference to the embodiment of the process employing the apparatus illustrated in the drawing, it should be noted that it is not intended that it be limited thereto, but is capable of other embodiments which may extend beyond the scope of the apparatus illustrated. Furthermore, the distribution and circulation of liquids and vapors is illustrated in the drawing by a diagrammatic representation of the apparatus employed. Hence, some of the mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, an aqueous solution of propanol and higher alcohols, such as is obtained from the aforementioned condensation of the reaction effluent produced in the catalytic hydrogenation of oxides of carbon, comprising $C_3$ to $C_7$ alcohols, is introduced through line 10 into an extraction tower 11. In this tower, the aqueous solution of alcohols introduced through line 10 is subjected to countercurrent contact with one or more of the aforementioned halogenated hydrocarbons, which, in the present embodiment of the process of the invention, has a boiling point higher than that of the heaviest alcohol present in the feed, for example, heptanol. Such a solvent may be a bromotoluene, which is introduced at an upper point above the feed-inlet through line 12. The solvent and the aqueous alcohol solution are contacted in tower 11 under conditions effective to absorb in the solvent substantially all of the alcohol contained in the feed, thus withdrawing these alcohols from the bulk of the water present. As a result of such treatment there are present in tower 11, an upper water-rich layer containing relatively minor amounts of the solvent treating agent which is withdrawn as an overhead raffinate through line 13 for further treatment in the process hereinafter described, and a lower layer comprising the aforementioned alcohols, absorbed in the solvent, and minor quantities of water, which is withdrawn as a bottoms extract through line 14.

The aforementioned extract from tower 11 is next passed through line 14 to a distillation tower 15. Tower 15 is heated to a temperature below the boiling point of the solvent but sufficiently high to take overhead, through line 16, a vaporized mixture of the aforementioned alcohols and dissolved water, leaving pure solvent as a bottoms product which is withdrawn through line 12 and recycled through this line for further use as the solvent in tower 11. Make-up quantities of solvent are introduced into tower 11 through line 17 via line 12, with which line 17 connects. The overhead vaporized mixture of alcohols and dissolved water withdrawn from tower 15, is next transferred through line 16 and cooled to liquefy the vapor components in a condenser 18. The resulting condensate from condenser 18 is next withdrawn via line 19 and transferred to a reflux drum 20. From drum 20, the cooled liquid mixture of $C_3$ to $C_7$ alcohols and water is withdrawn through line 21. A portion of the mixture thus withdrawn through line 21 may be transferred as reflux to tower 15, via line 22, if so desired.

The aforementioned aqueous mixture of alcohols in line 21 is next subjected to dehydration to remove the relatively small quantities of residual water present, as compared to the original quantities of water present in the feed introduced into tower 11 through line 10. Accordingly, this mixture in line 21 may be next transferred to a distillation tower 23. Tower 23 is operated under proper conditions of a temperature and pressure effective to distill overhead a relatively low boiling fraction, comprising propanol as its water-azeotrope, which is withdrawn in the vapor state through line 24. This propanol-water azeotrope is next transferred through line 24 and cooled to liquefy vapor components in a condenser 25. The resulting condensate from condenser 25, comprising the propanol-water azeotrope in the liquid state, is next withdrawn through line 26 and transferred to a reflux drum 27. From drum 27 the cooled liquid propanol-water azeotrope may be recycled through line 28 into line 10 for further treatment in tower 11, in the process hereinbefore described. If desired, a portion of the mixture in line 28 may be transferred as reflux to tower 23 through line 29. Bottoms from tower 23, comprising a mixture of $C_3$ to $C_7$ alcohols, substantially water-free, are withdrawn through line 30 as a product of the process.

As described above, the upper water-rich layer in tower 11, containing relatively minor amounts of the solvent treating agent, is withdrawn as a raffinate through line 13. This raffinate is next transferred through line 13 to a distillation tower 31. Tower 31 is operating at a temperature sufficiently high to take overhead the heterogenous azeotrope of the solvent (i. e., bromotoluene) and water, which is withdrawn in the vapor state through line 32. This solvent-water azeotrope is next transferred through line 32 and cooled to liquefy vapor components in a condenser 33. The resulting condensate from condenser 33, comprising the aforementioned solvent-water azeotrope in the liquid state, is next withdrawn through line 34 and transferred to a reflux drum 35. In drum 35, the cooled liquid solvent-water azeotrope will separate into an upper water layer and a lower solvent layer, by reason of the insolubility of bromotoluene in water. The lower solvent layer may be next transferred from drum 35 through line 36 and recycled, via line 12, for further use as the solvent treating agent in tower 11. The upper water layer may be transferred as reflux to tower 31, via line 37. Bottoms from tower 31 comprising water (solvent-free) are withdrawn through line 38.

In the embodiment presented above, there has been indicated the use of one of the aforementioned solvents whose boiling point is higher than that of the heaviest alcohol present in the feed. However, as previously indicated, it may be desired to use one of the aforementioned solvents whose boiling point is lower than that of the lightest alcohol component, namely, propanol. Such a solvent may be carbon tetrachloride. In the latter event it should be noted that carbon tetrachloride forms an azeotrope with propanol, thus preventing the recovery of the solvent, entirely free of propanol. Since carbon tetrachloride solvent, containing the small amount of azeotropic propanol must be recycled to the aforementioned extraction tower, total recovery of propanol from the aqueous feed will not be obtained. However, the auxiliary recovery of propanol from the raffinate phase may be effected, when the latter modification of the process of the invention (which is not shown in the drawing) is practiced, by conventional methods such as esterification; for example, treatment with acetic acid, in which propanol is recovered as anhydrous propyl acetate, water being removed as bottoms from the distillation of the esterified propanol-water mixture. It will also be noted that where the solvent comprises a halogenated hydrocarbon whose boiling point is lower than the lightest alcohol component present in the feed, the bulk of the solvent will be obtained as a relatively low-boiling fraction from the distillation of the extract phase rather than as a relatively high-boiling fraction thereof, as is the case in the first mentioned modification where bromotoluene is the solvent employed.

The following specific examples will serve to illustrate, but are not intended in any way to unnecessarily limit the scope of the present invention.

*Example I*

Employing the apparatus exemplified in the embodiment illustrated in the drawing, an aqueous solution of alcohols obtained as products from the condensation of the reaction effluent produced in a process for the catalytic hydrogenation of carbon monoxide and comprising by volume 20% propanol, 5% butanol and 75% water, is treated countercurrently in the extraction tower with a bromotoluene as the solvent. Supplying solvent at the rate of 0.67 pound per pound of feed, it is found that substantially all of the propanol and butanol present in the feed, is recovered in the extract phase in which the concentration of water is approximately 5% by weight. This extract is next distilled to separate the solvent as a relatively high boiling fraction from the remaining alcohols. The remaining alcohols, recovered as vapors, are condensed and subjected to distillation to take overhead residual water as propanol-water azeotropes. A substantially water-free mixture of propanol and butanol is recovered as bottoms from this last distillation step.

*Example II*

Repeating the process in Example I, an aqueous alcohol feed of similar composition is treated with o-bromotoluene; however, the solvent is supplied at a reduced rate of 0.4 pound per pound of feed. It is found that 75% of the propanol and substantially all of the butanol present in the feed are recovered in the extract phase in which the concentration of water is approximately 7% by weight. Following separation of the solvent from the extract and distillation of residual water, a substantially water-free mixture of propanol and butanol is recovered as bottoms. The residual raffinate contains relatively small quantities of solvent and propanol in water. This raffinate is next distilled to recover propanol as a low boiling fraction. The remaining mixture of solvent and water is further distilled to recover the heterogenous water-solvent azeotrope as a relatively low boiling fraction.

*Example III*

Repeating the process in Example I, an alcohol feed of similar composition is treated with carbon tetrachloride at the rate of 0.32 pound per pound of feed. It is found that approximately 50% of the propanol and substantially all of the butanol present in the feed are recovered in the extract phase in which the concentration of water is approximately 7% by weight. This extract is then subjected to distillation from which the bottoms product comprises propanol and butanol, substantially water-free. The overhead from this distillation, containing the ternary azeotrope of propanol, solvent and water, forms two layers on condensation. The upper water-rich layer is recycled to the aqueous alcohol feed, while a major portion of the lower solvent-rich layer is recycled to the extraction tower as the solvent therefor. The remaining portion of the solvent-rich layer is refluxed to the distillation tower. The raffinate from the extraction step is distilled to recover the relatively minor amount of solvent present for recycling to the extraction tower. The residue, comprising unextracted propanol, is esterified with acetic acid to effect recovery of residual propanol as propyl acetate.

We claim:

1. A method for separating an alcohol from an aqueous solution which comprises contacting an aqueous solution containing an alcohol having at least three carbon atoms per molecule with at least one liquid solvent selected from the group consisting of a bromotoluene and halogenated non-aromatic cyclic hydrocarbons.

2. A method for separating an alcohol from an aqueous solution which comprises contacting an aqueous solution containing propanol with at least one liquid solvent selected from the group consisting of a bromotoluene and halogenated non-aromatic cyclic hydrocarbons.

3. A method for separating an alcohol from an aqueous solution which comprises contacting an aqueous solution containing an alcohol having at least three carbon atoms per molecule with at least one liquid solvent selected from the group consisting of a bromotoluene and halogenated non-aromatic cyclic hydrocarbons under conditions such that a major portion of said alcohol is absorbed in said solvent to produce an extract comprising said absorbed alcohol and a major portion of said solvent and a raffinate comprising minor portions of said alcohol and said solvent in aqueous solution, distilling said extract to obtain a relatively low-boiling fraction comprising said alcohol in aqueous solution in the vapor state and a relatively high-boiling fraction comprising said solvent, recycling said high-boiling fraction to said extraction step, cooling and condensing said low-boiling fraction, and distilling said low-boiling fraction to produce a water-azeotrope of a portion of said alcohol and a bottoms product comprising said alcohol substantially water-free.

4. A method for separating an alcohol from an aqueous solution which comprises contacting an aqueous solution containing an alcohol having at least three carbon atoms per molecule with at least one liquid solvent selected from the group consisting of a bromotoluene and halogenated non-aromatic cyclic hydrocarbons under conditions such that a major portion of said alcohol is absorbed in said solvent to produce an extract comprising said absorbed alcohol and a major portion of said solvent and a raffinate comprising minor portions of said alcohol and said solvent in aqueous solution, separating and recovering alcohol substantially water-free from said extract, distilling said raffinate to produce a relatively low-boiling fraction comprising a water-azeotrope of said solvent in the vapor state and a relatively high-boiling fraction comprising water, cooling and condensing said water-azeotrope to obtain an upper phase comprising water and a lower phase comprising said solvent, separating said phases, and recycling said lower phase to said extraction step.

5. A method for separating an alcohol from an aqueous solution which comprises contacting an aqueous solution containing an alcohol having at least three carbon atoms per molecule with at least one liquid solvent selected from the group consisting of a bromotoluene and halogenated non-aromatic cyclic hydrocarbons under conditions such that a major portion of said alcohol is absorbed in said solvent to produce an extract comprising said absorbed alcohol and a major portion of said solvent and a raffinate comprising minor portions of said alcohol and said solvent in aqueous solution, distilling said extract to obtain a relatively low-boiling fraction comprising said alcohol in aqueous solution in the vapor state and a relatively high-boiling fraction comprising said solvent, recycling said high-boiling fraction to said extraction step, cooling and condensing said low-boiling fraction, distilling said low-boiling fraction to produce a water-azeotrope of a portion of said alcohol and a bottoms product comprising said alcohol substantially water-free, distilling said raffinate to produce a relatively low-boiling fraction comprising a water-azeotrope of said solvent in the vapor state and a relatively high-boiling fraction comprising water, cooling and condensing said water-azeotrope to obtain an upper phase comprising water and a lower phase comprising said solvent, separating said phases, and recycling said lower phase to said extraction step.

6. A method for separating an alcohol from an aqueous solution which comprises contacting an aqueous solution containing propanol with at least one liquid solvent selected from the group consisting of a bromotoluene and halogenated non-aromatic cyclic hydrocarbons under conditions such that a major portion of said propanol is absorbed in said solvent to produce an extract comprising said absorbed propanol and a major portion of said solvent and a raffinate comprising minor portions of said propanol and said solvent in aqueous solution, distilling said extract to obtain a relatively low-boiling fraction comprising said propanol in aqueous solution in the vapor state and a relatively high-boiling fraction comprising said solvent, recycling said high-boiling fraction to said extraction step, cooling and condensing said low-boiling fraction, and distilling said low-boiling fraction to produce a water-azeotrope of a portion of said propanol and a bottoms product comprising said propanol.

7. A method for separating an alcohol from an aqueous solution which comprises contacting an aqueous solution containing propanol with at least one liquid solvent selected from the group consisting of a bromotoluene and halogenated non-aromatic cyclic hydrocarbons under conditions such that a major portion of said propanol is absorbed in said solvent to produce an extract comprising said absorbed propanol and a major portion of said solvent and a raffinate comprising minor portions of said propanol and said solvent in aqueous solution, separating and recovering propanol substantially water-free from said extract, distilling said raffinate to produce a relatively low-boiling fraction comprising a water-azeotrope of said solvent in the vapor state and a relatively high-boiling fraction comprising water, cooling and condensing said water-azeotrope to obtain an upper phase comprising water and a lower phase comprising said solvent, separating said phases, and recycling said lower phase to said extraction step.

8. A method for separating an alcohol from an aqueous solution which comprises contacting an aqueous solution containing propanol with at least one liquid solvent selected from the group consisting of a bromotoluene and halogenated non-aromatic cyclic hydrocarbons under conditions such that a major portion of said propanol is absorbed in said solvent to produce an extract comprising said absorbed propanol and a major portion of said solvent and a raffinate comprising minor portions of said propanol and said solvent in aqueous solution, distilling said extract to obtain a relatively low-boiling fraction comprising said propanol in aqueous solution in the vapor state and a relatively high-boiling fraction comprising said solvent, recycling said high-boiling fraction to said extraction step, cooling and condensing said low-boiling fraction, distilling said low-boiling fraction to produce a water-azeotrope of a portion of said propanol and a bottoms product comprising said propanol substantially water-free, distilling said raffinate to produce a relatively low-boiling fraction comprising a water-azeotrope of said solvent in the vapor state and a relatively high-boiling fraction comprising water, cooling and condensing said water-azeotrope to obtain an upper phase comprising water and a lower phase comprising said solvent, separating said phases, and recycling said lower phase to said extraction step.

9. The process of claim 1 wherein said solvent comprises a bromotoluene.

10. In a process for the catalytic hydrogenation of an oxide of carbon in which is obtained an aqueous solution of an alcohol having at least three carbon atoms per molecule, the method for recovering said alcohol from its aqueous solution which comprises contacting said aqueous solution with at least one liquid solvent selected from the group consisting of a bromotoluene and halogenated non-aromatic cyclic hydrocarbons under conditions such that a major portion of said alcohol is absorbed in said solvent to produce an extract comprising said absorbed alcohol and a major portion of said solvent and a raffinate comprising minor portions of said alcohol and said solvent in aqueous solution, distilling said extract to obtain a relatively low-boiling fraction comprising said alcohol in aqueous solution in the vapor state and a relatively high-boiling fraction comprising said solvent, recycling said high-boiling fraction to said extraction step, cooling and condensing said low-boiling fraction, and distilling said low-boiling fraction to produce a water-azeotrope of a portion of said alcohol and a bottoms product comprising said alcohol substantially water-free.

11. In a process for the catalytic hydrogenation of an oxide of carbon in which is obtained an aqueous solution of an alcohol having at least three carbon atoms per molecule, the method for recovering said alcohol from its aqueous solution which comprises contacting said aqueous solution with at least one liquid solvent selected from the group consisting of a bromotoluene and halogenated non-aromatic cyclic hydrocarbons under conditions such that a major portion of said alcohol is absorbed in said solvent to produce an extract comprising said absorbed alcohol and a major portion of said solvent and a raffinate comprising minor portions of said alcohol and said solvent in aqueous solution, separating and recovering alcohol substantially water-free from said extract, distilling said raffinate to produce a relatively low-boiling fraction comprising a water-azeotrope of said solvent in the vapor state and a relatively high-boiling fraction comprising water, cooling and condensing said water-azeotrope to obtain an upper phase comprising water and a lower phase comprising said solvent, separating said phases, and recycling said lower phase to said extraction step.

12. In a process for the catalytic hydrogenation of an oxide of carbon in which is obtained an aqueous solution of an alcohol having at least three carbon atoms per molecule, the method for recovering said alcohol from its aqueous solution which comprises contacting said aqueous solution with at least one liquid solvent selected from the group consisting of a bromotoluene and halogenated non-aromatic cyclic hydrocarbons under conditions such that a major portion of said alcohol is absorbed in said solvent to produce an extract comprising said absorbed alcohol and a major portion of said solvent and a raffinate comprising minor portions of said alcohol and said solvent in aqueous solution, distilling said extract to obtain a relatively low-boiling fraction comprising said alcohol in aqueous solution in the vapor state and a relatively high-boiling fraction comprising said solvent, recycling said high-boiling fraction to said extraction step, cooling and condensing said low-boiling fraction, distilling said low-boiling fraction to produce a water-azeotrope of a portion of said alcohol and a bottoms product comprising said alcohol substantially water-free, distilling said raffinate to produce a relatively low-boiling fraction comprising a water-azeotrope of said solvent in the vapor state and a relatively high-boiling fraction comprising water, cooling and condensing said water-azeotrope to obtain an upper phase comprising water and a lower phase comprising said solvent, separating said phases, and recycling said lower phase to said extraction step.

13. The process of claim 1 wherein said solvent comprises a halogenated cycloparaffin.

14. The process of claim 1 wherein said solvent comprises chlorocyclohexane.

15. The process of claim 1 wherein said solvent comprises a halogenated non-aromatic cyclic hydrocarbon.

16. The process of claim 1 wherein said solvent comprises a halogenated cycloolefin.

WALTER E. LOBO.
GEORGE T. SKAPERDAS.

REFERENCES CITED

The following references are of record in the file of this patent:

UNITED STATES PATENTS

| Number | Name | Date |
| --- | --- | --- |
| 2,033,684 | Coleman et al. | Mar. 10, 1936 |
| 2,139,953 | Guinot | Dec. 13, 1938 |
| 2,238,929 | Reibuitz | Jan. 14, 1941 |
| 2,274,750 | Soenksen et al. | Mar. 3, 1942 |

FOREIGN PATENTS

| Number | Country | Date |
| --- | --- | --- |
| 410,816 | Great Britain | May 18, 1934 |